US007136859B2

(12) United States Patent
Lucovsky et al.

(10) Patent No.: US 7,136,859 B2
(45) Date of Patent: Nov. 14, 2006

(54) ACCESSING HETEROGENEOUS DATA IN A STANDARDIZED MANNER

(75) Inventors: Mark Lucovsky, Sammamish, WA (US); Shaun D. Pierce, Sammamish, WA (US); Alexander T. Weinert, Seattle, WA (US); Michael G. Burner, Redmond, WA (US); Richard B. Ward, Redmond, WA (US); Paul J. Leach, Seattle, WA (US); George M. Moore, Issaquah, WA (US); Arthur Zwiegincew, Bothell, WA (US); Robert M. Hyman, Sammamish, WA (US); Jonathan D. Pincus, Bellevue, WA (US); Daniel R. Simon, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 813 days.

(21) Appl. No.: 10/003,753

(22) Filed: Oct. 22, 2001

(65) Prior Publication Data

US 2002/0184214 A1    Dec. 5, 2002

Related U.S. Application Data

(60) Provisional application No. 60/275,809, filed on Mar. 14, 2001.

(51) Int. Cl.
*G06F 7/00* (2006.01)
*G06F 17/30* (2006.01)

(52) U.S. Cl. ............ 707/100; 707/103 R; 707/103 X; 707/103 Z

(58) Field of Classification Search ............ 707/101, 707/2, 203, 122, 103, 1, 200; 709/217
See application file for complete search history.

(56) References Cited

U.S. PATENT DOCUMENTS

| 6,088,675 | A | 7/2000 | MacKenty et al. ......... 704/270 |
| 6,154,876 | A | 11/2000 | Haley et al. ................. 717/4 |
| 6,195,662 | B1* | 2/2001 | Ellis et al. ............. 707/103 R |
| 6,223,207 | B1 | 4/2001 | Lucovsky et al. .......... 709/107 |
| 6,282,548 | B1 | 8/2001 | Burner et al. ............... 707/104 |

(Continued)

OTHER PUBLICATIONS

Simple Object Access Protocol (SOAP) 1.1 W3C Note May 8, 2000 Don Box, DevelopMentor; David Ehnebuske, IBM; Gopal Kakivaya, Microsoft Andrew Layman, Microsoft; Noah Mendelsohn, Lotus Development Corp.; Henrik Frystyk Nielsen, Microsoft; Satish Thatte, Microsoft; Dave Winer, UserLand Software, Inc. pp. 1-35.

*Primary Examiner*—Sam Rimell
*Assistant Examiner*—Jacob F. Betit
(74) *Attorney, Agent, or Firm*—Workman Nydegger

(57) ABSTRACT

Directly operating on data structures in a generic manner regardless of the type of data structure being operated upon and without requiring dedicated executable code for manipulating data structures of the particular data type. A common set of commands (e.g., insert, delete, replace, update, query) are recognized that may be used to operate on data structures of a number of different data types. A navigation module accesses a request to execute one of the common command methods on at least an identified portion of an identified data structure. Then, the navigation module accesses a navigation assistance module to access a set of rules associated with the particular data type, the set of rules allowing the navigation module to find the portion of the data structure that is to be operated on. If appropriate, the command operation is then executed on the identified portion of the data structure.

48 Claims, 6 Drawing Sheets

U.S. PATENT DOCUMENTS

| | | |
|---|---|---|
| 6,349,302 B1 | 2/2002 | Aoyama et al. .............. 707/101 |
| 6,370,537 B1 | 4/2002 | Gilbert et al. .............. 707/101 |
| 6,377,952 B1 * | 4/2002 | Inohara et al. .............. 707/101 |
| 6,654,747 B1 * | 11/2003 | Van Huben et al. .......... 707/10 |
| 6,684,204 B1 * | 1/2004 | Lal .............................. 707/3 |
| 2002/0029256 A1 | 3/2002 | Zintel et al. ................. 709/218 |

* cited by examiner

ACCESSING HETEROGENEOUS DATA IN A STANDARDIZED MANNER

CROSS-REFERENCE TO RELATED APPLICATIONS

The present application claims priority from co-pending U.S. provisional application Ser. No. 60/275,809, filed Mar. 14, 2001 and entitled "Identity-Based Service Communication Using XML Messaging Interfaces", which provisional application is incorporated herein by reference in its entirety.

BACKGROUND OF THE INVENTION

1. The Field of the Invention

The present invention relates to the field of data access technologies. Specifically, the present invention relates to methods, systems, and computer program products for accessing heterogeneous data in a standardized manner.

2. Background and Related Art

The success of the information age is widely attributed to the ability to efficiently access data. Data comes in a wide, almost unlimited, variety of different data types. For example, there may be data types corresponding to calendar information, task information, in-box information, word processing documents, presence information, favorite web site information, or a host of other different types of information.

Typically, a data structure is accessed using an object that is customized with special executable code and properties that are tailored towards accessing data structures of particular data types. This conventional model is illustrated in FIG. 1. The illustrated model 100 includes only three types of data being accessed; namely, calendar data 110, in-box data 120, and document data 130. Although the conventional model includes any number of different data types, only three are shown for clarity.

Each of the data types, such as calendar data 110, in-box data 120, and document data 130, are encapsulated by a corresponding object such as calendar object 111, in-box object 121, and document object 131, respectively. These objects each contain code (e.g., calendar code 112, in-box code 122, and document code 132) and properties (e.g., calendar properties 113, in-box properties 123, and document properties 133) that are customized to the particular data type being encapsulated. In addition, the various services of the objects are accessed through controlled and type-specific interfaces (e.g., calendar interface 114, in-box interface 124, and document interface 134) that offer customized methods that are appropriate for the corresponding data type. For example, these interfaces may service customized function calls.

While this conventional model allows various entities to access corresponding data, the access methods differ from data type to data type. In addition, a customized data object is required for each data type. In this context, what is desired are methods, systems, and computer program products that facilitate access to data in a more efficient manner.

SUMMARY OF THE INVENTION

The present invention extends to methods, systems and computer products for directly operating on data structures in a generic manner regardless of the type of data structure being operated upon and without requiring dedicated executable code for manipulating data structures of the particular data type. A common set of commands is recognized that may be used to operate on data structures of a number of different data types. Such command methods may be generic in nature and generally applicable to most, if not all, data types, such as insert, delete, replace, update, query, or the like.

A navigation module accesses a request to execute one of the common command methods on at least an identified portion of an identified data. In one example implementation, the request follows XML grammar. Then, the navigation module accesses a navigation assistance module to access a set of rules associated with the particular data type, the set of rules allowing the navigation module to find the portion of the data structure that is to be operated on.

Then, the navigation module determines whether the specified command may be performed on that portion of the data structure. In order to limit the complexity of the navigation module, only certain portions of the data structure may have certain operations performed thereon, thus limiting the number of request scenarios that may be responded to. In particular, request scenarios that would require undue processing and memory resources are eliminated. In one example, the data structure is an XML document of a particular XML class.

If appropriate, the command operation is then executed on the identified portion of the data structure. Instead of having a custom object that encapsulates each type of data structure, the navigation module may execute commands on a wide variety of data structures by accessing rules that define how to navigate through each data structure, thus standardizing and simplifying data access techniques.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
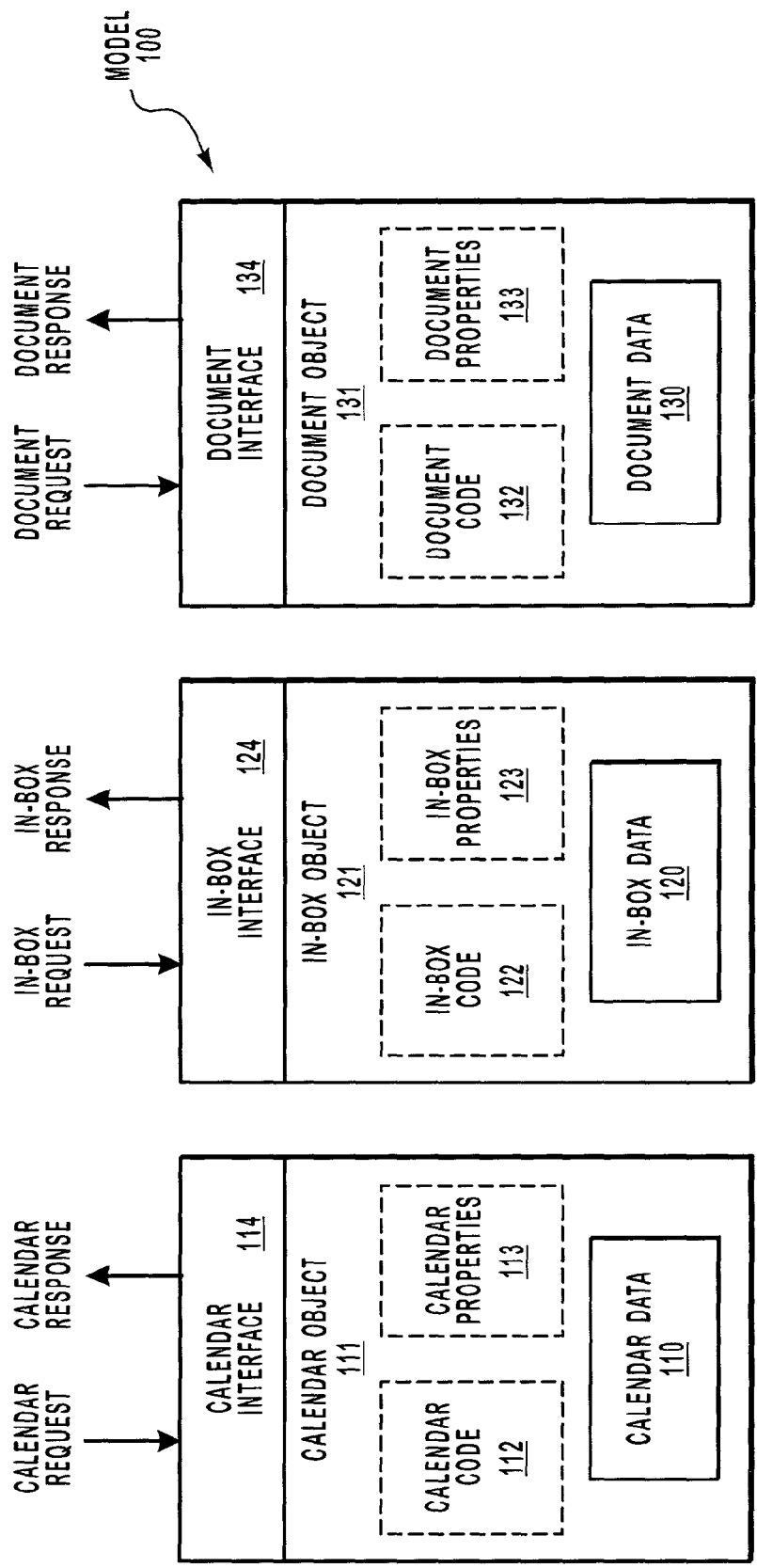
FIG. 1 schematically illustrates a conventional model for data access in which customized objects encapsulate data, and in which the data is accessed through customized interfaces of the customized objects.

The present invention extends to methods, systems and computer products for directly operating on data structures in a generic manner regardless of the type of data structure being operated upon and without requiring dedicated executable code for manipulating data structures of the particular data type. A common set of commands is recognized that may be used to operate on data structures of a number of different data types. Such command methods may be generic in nature and generally applicable to most, if not all, data types, such as insert, delete, replace, update, query, or the like.

A navigation module accesses a request to execute one of the common command methods on at least an identified portion of an identified data. Then, the navigation module accesses a navigation assistance module to access a set of rules associated with the particular data type, the set of rules allowing the navigation module to find the portion of the data structure that is to be operated on. Then, the navigation module determines whether the specified command may be performed on that portion of the data structure. If appropriate, the command operation is then executed on the identified portion of the data structure.

The embodiments of the present invention may comprise a special purpose or general purpose computing device including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer.

By way of example, and not limitation, such computer-readable media can comprise physical storage media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. The claims may mention the term "computer program product." In this description and in the claims, this term does not imply that the computer program product was bought or offered for a price. The term "computer program product" also refers to free products.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions. In this description and in the claims, a "network" is defined as any medium over which messages may be communicated. Thus, a network may include a medium for messaging between two different machines. However, a network may also be a mechanism for communicating messages between two processes running on the same machine.

Although not required, the invention will be described in the general context of computer-executable instructions, such as program modules, being executed by computing devices. Generally, program modules include routines, programs, objects, components, data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Figure 2:
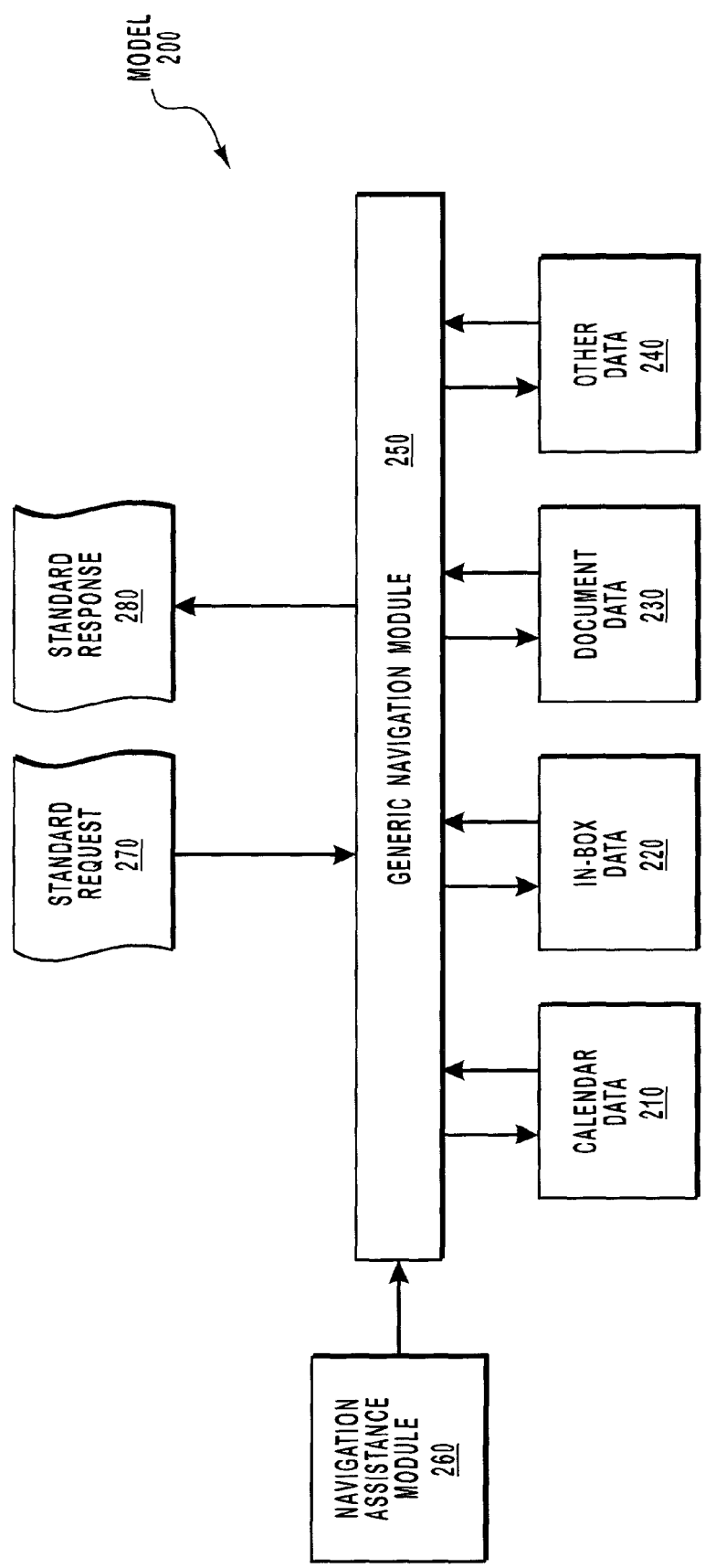
FIG. 2 schematically illustrates a system in accordance with the present invention in which a variety of heterogenic data structures are accessed through a single navigation module using a common set of command methods.

As previously mentioned, the conventional model 100 for data access of FIG. 1 has custom objects through which applications access data via custom interfaces. In contrast, the model 200 of FIG. 2 illustrates a generic navigation module 250 through which applications may access a wide variety of data such as calendar data 210, in-box data 220, document data 230, or other data 240. This data may include data that is maintained in an identity-centric manner as described in commonly-owned co-pending U.S. patent application Ser. No. 10/003,750 filed on the same date as this application, and entitled "identity-centric data access", which application is incorporated herein by reference in its entirety. As used in this description and in the claims, an "identity" may be an individual, a group of individuals, an organization, or any other identifiable entity.

In particular, the identity-centric data includes various schema types including, for example, calendar, contacts, profile, and others that follows a particular schema or set of rules. Each data structure is associated with an identity or owner who controls access to the data structure. When a requestor wants to operate on the data structure, the request identifies the data structure by identifying the owner of the data, and by identifying the particular schema type. If there is more than one instance of that schema type for that owner, the request would also specify the instance desired to be operated upon.

A common set of command methods may be used to perform operations on the various data structure even though those data structures may represent different data and be organized quite differently. Such command methods may describe generic operations that may be desired on a wide variety of data structures. Such operations may include, for example, insert, delete, replace, update, or query operations.

A navigation assistance module 260 has information that defines how to navigate through the various data structures, and may also indicate what command methods may be executed on what portions of the data structure. Although only one navigation assistance module 260 is shown coupled to generic navigation module 250, there may be multiple navigation assistance modules that may each specialize as desired. In addition, though the navigation assistance module 260 is illustrated as a separate module, some or all of the operations of the navigation assistance module 260 may be incorporated into the generic navigation module 250, and vice versa.

In one embodiment, the various data structures 210, 220, 230 and 240 may be organized hierarchically and may be XML documents of various XML classes. In that case, the navigation assistance module 260 may contain a schema associated with each of the classes of XML documents. In this description and in the claims, a "schema" is defined as a set of rules that define how a data structure may be organized. Also, the schema may define, via color-coding or other identification mechanisms, what portions of the XML documents may be operated on. A specific example of XML documents that may be operated on will be described in detail further below. The schema also may define how the structure of the XML document may be extended to include elements not expressly mentioned in the schema.

Figure 3:
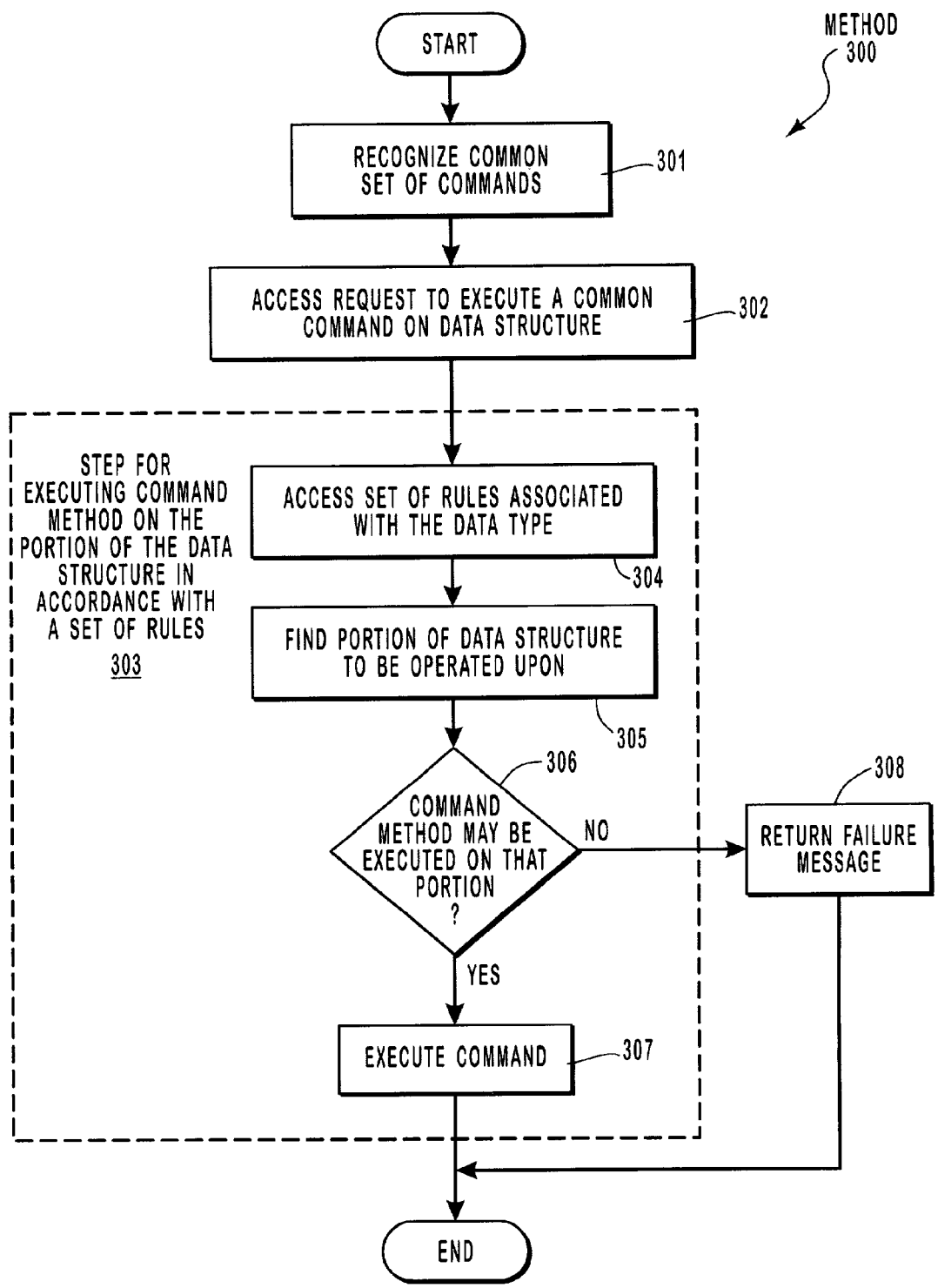
FIG. 3 illustrates a flowchart of a method for directly operating on data structures in a generic manner regardless of the type of data structure being operated upon and without requiring dedicated executable code for manipulating data structures of the particular data type.

Referring to FIG. 3, the model 200 may be used to perform a method 300 for directly operating on data structures in a generic manner regardless of the type of data structure being operated upon and without requiring dedicated executable code for manipulating data structures of any particular data type. First, the generic navigation module may recognize a common set of command methods (act 301) that may be used to operate on data structures of a number of different data types as described above and as described in further detail below.

The generic navigation module 250 then accesses a request such as standard request 270 to execute one of the common command methods on at least a portion of one of the data structures (act 302) of a particular data type. In one embodiment, the request 270 and the corresponding response 280 are each XML documents encapsulated within a Simple Object Access Protocol (SOAP) envelope. Such SOAP envelopes may, in turn, be encapsulated within a transfer protocol structure such as a HyperText Transfer Protocol (HTTP) message. Since the data structures may be associated with identities, the target data structure that is desired to be manipulated may be identified using the identity as well as the particular schema that the data structure follows, along with an instance identifier if there are multiple instances of a particular schema type that belong to a particular identity.

The method 300 then includes a step for executing the command method on the portion of the data structure in accordance with a set of rules associated with the particular data type (step 303). This step may include any corresponding acts for accomplishing this result. However, in FIG. 3, the step for executing the command method includes corresponding acts 304, 305, 306, and 307.

In particular, the generic navigation module 250 accesses a set of rules associated with the particular data type (act 304). This set of rules may be maintained by the navigation assistance module 260. The set of rules defines how a data structure of the particular data type may be organized. For example, the set of rules may be a schema. The generic navigation module 250 then uses the set of rules to find the portion of the data structure that is to be operated upon (act 305), and determines whether the command method may be executed on that portion of the data structure (act 306).

Figure 4:
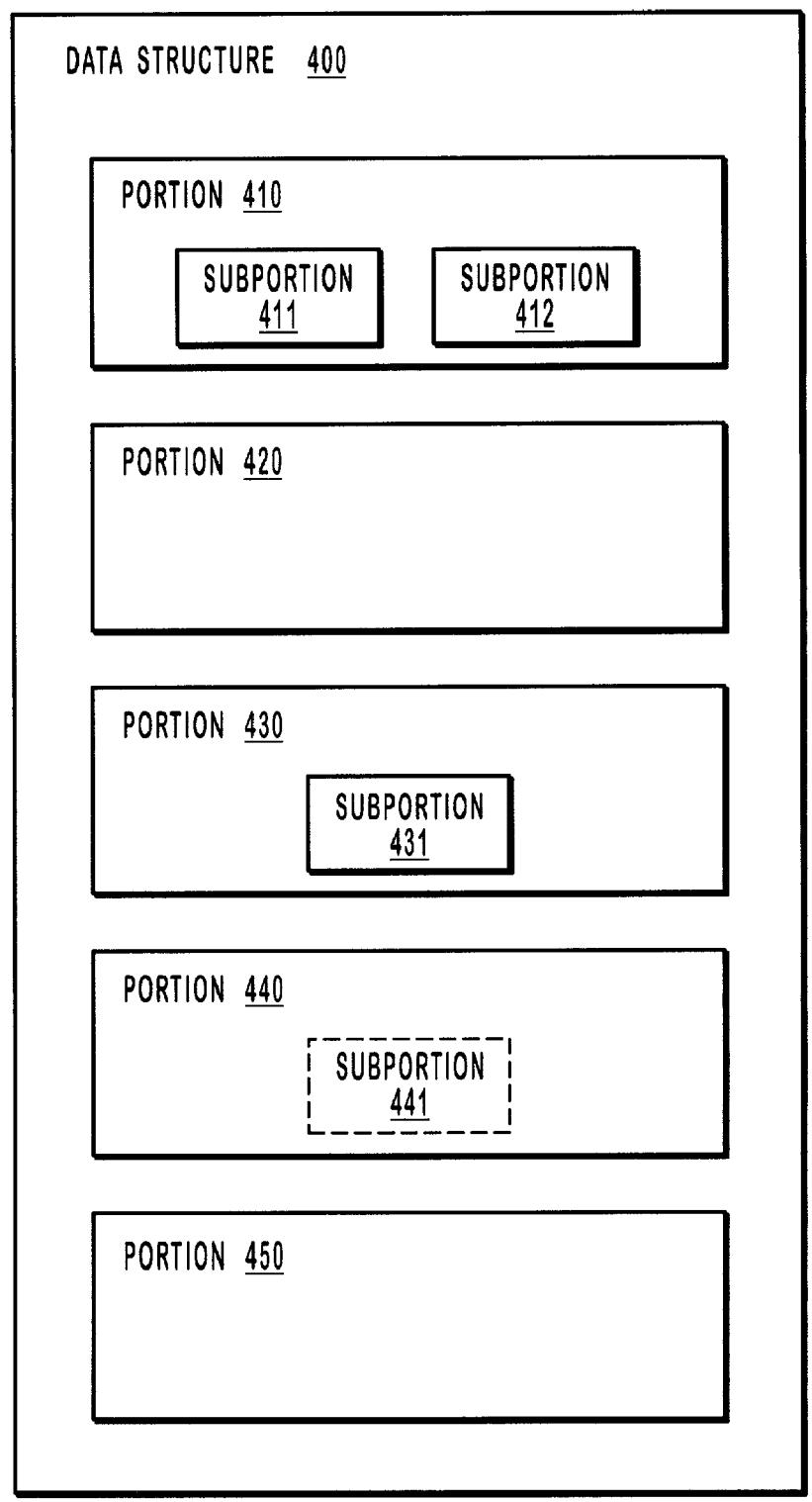
FIG. 4 schematically illustrates a data structure that may be operated on using the system of FIG. 2.

For example, FIG. 4 schematically illustrates a data structure 400 that has various portions that may be operated upon including portions 410, 420, 430, 440, and 450. In addition, some portions may contain subportions, such as subportions 411, 412 and 431, that may be operated upon. In one example implementation, the data structure 400 is an XML document having a root element, and top-level elements that are direct children of the root element. In that case, the portions 410, 420, 430, 440, and 450 may be, for example, the top-elements, while the subportions 411, 412, and 431 may be attributes of the top-level elements.

The data structure may also include other portions that may not be operated upon as an entity, but only if the nesting portion is also operated upon. For example, subportion 441 represents a portion that may not be operated upon as represented by the subportion 441 being a dashed box. Thus, in order to operate on the subportion 441, one would have to operate on the portion 440 as a whole.

Referring back to FIG. 3, if the command method of the request may be executed on the portion of the data structure (YES in act 306), the command method is then executed on the portion of the data structure (act 307). Otherwise, a failure message is returned via, for example, standard response 280 indicating the denial of the request (act 308).

Having described the general principles of the present invention, a specific example implementation will now be described. In this example, each of the data structures to be accessed are eXtenstible Markup Language (XML) documents. In this description and in the claims, "extensible Markup Language" or "XML" refers to Extensible Markup Language version 1.0 or any subsequent version whether now existing or to be developed in the future.

In the following examples, only some portions of any target XML document may be operated upon. These portions will be referred to as "operatable" portions. These operatable portions include the root element (i.e., the entire XML document), and any top-level elements (i.e., any element that is a direct nested child of the root element). Also, some of the attribute values of any top-level element may be operated upon such as a "changeNumber" or "id" attribute of a top-level element. In addition, some second-level elements that are direct children of top-level element (e.g., a "catDef" element as in the following examples) may also be operatable portions. In order to operate on any of the subelements of these operatable portions, one must operate on the entire operatable portions (unless, of course, the subelement itself was also an operatable portion). Operatable portions may be identified so as to limit the number of response scenarios. In particular, response scenarios that require undue use of processor and memory resources may be eliminated, thereby improving the efficiency of data access.

One of the command methods that may be supported by the generic navigation module 250 is called herein "insertRequest", which is essentially a request to insert an XML fragment into a selected context of an XML document. This request may be honored so long as the XML fragment follows the schema associated with that context. The following text illustrates an example target XML document just before an "insertRequest" command method is executed thereon. Throughout the following examples, an "m" as in <m:myWidgets . . . > and an "hs" as in <hs:insertRequest . . . > represent the namespace or schematic that may be used to interpret the corresponding element.

```xml
<m:myWidgets instanceId="1976" changeNumber="1">
</m:myWidgets>
```

The following is an XML "insertRequest" command that may be executed on that target XML document:

```xml
<hs:insertRequest select="/">
    <hs:catDef idName="manufacturer">
        <hs:name xml:lang="en">Widget manufacturer</hs:name>
        <hs:description xml:lang="en">
            This category describes a widget manufacturer.
        </hs:description>
    </hs:catDef>
    <hs:catDef idName="manufacturer_acme">
        <hs:name xml:lang="en">Acme, Inc.</hs:name>
        <hs:implies ref="manufacturer"/>
    </hs:catDef>
    <m:widget>
        <m:name xml:lang="en">My first widget</m:name>
        <m:unitPrice currency="USD">65.00</m:unitPrice>
    </m:widget>
    <m:widget>
        <m:name xml:lang="en">TurboMaster 2000</m:name>
        <m:unitPrice currency="PLN">14.99</m:unitPrice>
    </m:widget>
</hs:insertRequest>
```

The following represents an XML response to this request:

```xml
<hs:insertResponse selectedNodeCount="1" status="success" newChangeNumber="2">
    <hs:newBlueId id="1"/>
    <hs:newBlueId id="2"/>
    <hs:newBlueId id="3"/>
    <hs:newBlueId id="4"/>
</hs:insertRequest>
```

The following represents the resulting target XML document after the "insertRequest" method is executed thereon:

```xml
<m:myWidgets instanceId="1976" changeNumber="2">
    <hs:catDef idName="manufacturer" id="1" changeNumber="2" creator="532656235265">
        <hs:name xml:lang="en">Widget manufacturer</hs:name>
        <hs:description xml:lang="en">
            This category describes a widget manufacturer.
        </hs:description>
    </hs:catDef>
    <hs:catDef idName="manufacturer_acme" id="2" changeNumber="2" creator="532656235265">
        <hs:name xml:lang="en">Acme, Inc.</hs:name>
        <hs:implies ref="manufacturer"/>
    </hs:catDef>
    <m:widget id="3" changeNumber="2" creator="532656235265">
        <m:name xml:lang="en">My first widget</m:name>
        <m:unitPrice currency="USD">65.00</m:unitPrice>
    </m:widget>
    <m:widget id="4" changeNumber="2" creator="532656235265">
        <m:name xml:lang="en">TurboMaster 2000</m:name>
        <m:unitPrice currency="PLN">14.99</m:unitPrice>
    </m:widget>
</m:myWidgets>
```

As apparent from this example, the request inserts four top-level elements into the root element. The inserted top-level element include two "m:catDef" elements and two "m:widget" elements with their supplied contents. The context for where the top-level elements were inserted was defined by the "select" attribute of the "insertRequest" element in the request. The attribute/value pair "select="/"" indicates that the context is the root node, thus indicating that the XML fragments contained within the "insertRequest" element are to be inserted into the root element. Note that all four inserted elements are inserted as top-level elements (i.e., direct child elements of the root element) and thus are considered operatable portions.

The schema that defines the structure of the "m:myWidgets" root element presumably allows for multiple top-level "m:catDef" elements followed by multiple "m:widget" elements. The schema also presumably allows for the "m:catDef" elements and the "m:widget" elements to have the content designated in the request. Otherwise, the generic navigation module 250 would not successfully execute the "insertRequest" method since that would result in an "m:myWidgets" element that violates its corresponding schema.

Although the select attribute of the root request element of "insertRequest" indicated a value of "/", more complex context values may be used. For example, consider the following request:

```xml
<hs:insertRequest select="/m:myWidgets/m:widget">
    <hs:cat ref="manufacturer_acme"/>
</hs:insertRequest>
```

Assuming the schema so permits, this request would select the context for the insert operation to be each of the two "m:widget" elements. Navigation to these elements was accomplished using the XPATH statement in the "select" attribute of the "insertRequest" element. In this description and in the claims, "XPATH" refers to XML Path Language Version 1.0 published by WC3. The "hs:cat ref="manufacturer_acme"/" second-level element is then added to each of the "m:widget" elements. In this example, assume that the "hs:cat" element may be directly operated upon even if it is a second-level element. In response to the request, the change number of the root element, and the two "m:widget" elements would have been incremented to 3. The response would indicate this new change number, the success status of the operation, and the number of nodes that were altered (in this case, two). In the manner, insert operations may be performed.

Another common command method may be a query command which, in this implementation, is represented by an XML "queryRequest" element. The simplest form of the query message simply retrieves the document using the following request:

Request:

```xml
<hs:queryRequest>
    <hs:xpQuery select="/"/>
</hs:insertRequest>
```

The select attribute of the "hs:xpQuery" has a value of "/" indicating that the root element is to be returned along with its contents. In other words, the entire XML document is returned in the response. The response would be in the form of a queryResponse XML element that contains the entire queried data structure.

Suppose the "select" attribute of the "queryRequest" element had an XPATH value such "/m:myWidgets/hs:catDef[@idName='manufacturer' ]", then just the portion identified by the XPATH statement would be returned in the response. In that case, just the top-level "catDef" element having the "idName" attribute of value "manufacturer" would be returned. Thus the response would appear as follows.

```
<hs:queryResponse>
    <hs:xpQueryResponse status="success">
        <hs:catDef idName="manufacturer" id="1" change-
            Number="2" creator="532656235265">
            <hs:name xml:lang="en">Widget manufacturer</
                hs:name>
            <hs:description xml:lang="en">
                This category describes a widget manufacturer.
            </hs:description>
        </hs:catDef>
    </hs:xpQueryResponse>
</hs:queryResponse>
```

Multiple queries may also be specified in a single "queryRequest" element as follows:

```
<hs:queryRequest>
    <hs:xpQuery        select="/m:myWidgets/hs:catDef
        [@idName='manufacturer']"/>
    <hs:xpQuery    select="/m:myWidgets/m:widget[m:unit-
        Price]"/>
</hs:insertRequest>
```

Thus, three elements would be returned, one being the top-level "catDef" element having the attribute "idName" of value "manufacturer", and the other being any top-level "m:widget" element (in this case, both "m:widget" elements) that contains an element called "unitPrice".

One may also assert that the number of nodes in the selection falls in a given range for the query and for other types of common command methods. This is expressed using "minOccurs" and "maxOccurs" attributes. If a minOccurs/maxOccurs test fails on any node, the request is considered unsuccessful. For example, consider the following request being executed on the example XML document.

```
<hs:queryRequest>
    <hs:xpQuery select="/m:myWidgets/m:widget" maxOc-
        curs="1"/>
    <hs:xpQuery select="/m:myWidgets/m:widget" minOc-
        curs="2" maxOccurs="5"/>
</hs:insertRequest>
```

The first "xpQuery" elements queries for any "m:widget" element, but specifies that the maximum number of such elements should not be more than 1 to be considered successful. Since the example XML document has 2 such "m:widget" elements, this would result in failure. Also, for the same reason, the second "xpQuery" element would be successful since the number of "m:widget" elements is between 2 and 5. Accordingly, the second "xpQuery" element would result in all of the "m:widget" elements being returned in the response.

Another common command method is a delete operation. This is represented in this example implementation by an XML element called "deleteRequest" which deletes the selected nodes and all its contents. For example, consider the following delete request: <hs:deleteRequest select="//m:widget[m:unitPrice='65.00']"/>

This would result in the one "m:widget" element that has a child element "unitPrice" of value "65.00" being deleted.

Another type of common command is a replace operation. In the example implementation, an XML "replaceRequest" element represents a request to replace the content of each of the selected nodes with the specified new content. One way to think of this operation is as an atomic delete of the content of the selected node, followed by an insert of the new content. All of the content (text, attributes, elements) in the selected nodes are replaced with the new item specified in this message. The node type of the selected node and of the replacement node must be the same. Consider the following request.

```
<hs:replaceRequest select="//m:widget[@id='4'] " minOc-
    curs="1" maxOccurs="1">
    <m:widget>
        <hs:cat ref="m:bigWidget"/>
        <m:name    xml:lang="pl">TurboMaster    3000</m:
            name>
        <m:unitprice currency="PLN">8.99</m:unitPrice>
    </m:widget>
</hs:replaceRequest>
```

This would result in the top-level "m:widget" element being changed from the following element:

```
<m:widget    id="4"    changeNumber="2"    cre-
    ator="532656235265">
    <m:name    xml:lang="en">TurboMaster    2000</m:
        name>
    <m:unitprice currency="PLN">14.99</m:unitPrice>
</m:widget>
``` to the following element:

```
<m:widget    id="4"    changeNumber="3"    cre-
    ator="532656235265">
    <hs:cat ref="m:bigWidget"/>
    <m:name    xml:lang="pl">TurboMaster    3000</m:
        name>
    <m:unitPrice currency="PLN">8.99</m:unitPrice>
</m:widget>
``` assuming that this was acceptable given the schema. The following response message gives the new changeNumber associated with the altered element:

<hs:replaceResponse            selectedNodeCount="1" status="success" newChangeNumber="3"/>.

As previously mentioned, only certain portions of a data structure may be operated upon. In the example, the top-level elements may be operated upon. These elements are directly addressable by an "id" attribute and their change status is tracked through the "changeNumber" attribute. For example, one may not simply replace the second-level "unitPrice" element since it is not an operatable element without replacing the entire "m:widget" element, which is an operatable element.

Another type of common command method would be a request that bundles different permutations of the insert, delete, and replace methods (hereinafter, called an "update" request). In the specific implementation, this update operation is implemented by an XML "updateRequest" element. This "updateRequest" element also handles various error modes as is now described by way of example. The following example shows the behavior of a "rollbackBlockAndFail" error mode. If any operation within the "updateBlock fails", all enclosed operations are rolled back to their initial state and the request ends in failure (without attempting any remaining operations). The following is a target XML document for execution of the update request:

```xml
<m:mywidgets instanceId="1976" changeNumber="12">
    <m:widget id="4" changeNumber="8" creator="532656235265">
        <hs:cat ref="m:bigWidget"/>
        <m:name xml:lang="en">TurboMaster 3000</m:name>
        <m:unitPrice currency="PLN">8.99</m:unitPrice>
    </m:widget>
    <m:widget id="5" changeNumber="10" creator="532656235265">
        <hs:cat ref="m:bigWidget"/>
        <m:name xml:lang="en">MegaInterceptor 4000</m:name>
        <m:unitPrice currency="USD">128.00</m:unitPrice>
    </m:widget>
    <m:order id="6" changeNumber="12" creator="532656235265">
        <m:status>shipped</m:status>
        <m:shipTo>
            <m:officialAddressLine xml:lang="en">1 Microsoft Way</m:officialAddressLine>
            <m:internalAddressLine xml:lang="en">118/1594</m:internalAddressLine>
            <m:primaryCity xml:lang="en">Redmond</m:primaryCity>
            <m:subdivision xml:lang="en">WA</m:subdivision>
            <m:postalCode xml:lang="en">98052</m:postalCode>
        </m:shipTo>
        <m:widget idRef="4" number="2"/>
        <m:widget idRef="5" number="2"/>
        <m:summary id="8" changeNumber="12" creator="532656235265">
            <m:subtotal>273.98</m:subtotal>
            <m:shipping>10.00</m:shipping>
            <m:handling>2.00</m:handling>
            <m:total>285.98</m:total>
        </m:summary>
    </m:order>
</m:myWidgets>
```

The following is the update request to be executed on this XML document:

```xml
<hs:updateRequest>
    <hs:updateBlock select="//m:widget[@id='4']" minOccurs="1" maxOccurs="1" errorMode="rollbackBlockAndFail">
        <hs:replaceRequest select="./hs:cat/@ref">
            <hs:attributes ref="m:smallWidget"/>
        </hs:replaceRequest>
        <hs:insertRequest select=".">
            <hs:cat ref="m:formerlyBigWidget"/>
        </hs:insertRequest>
    </hs:updateBlock>
    <hs:updateBlock select="//m:widget[@id='7']" minOccurs="1" maxOccurs="1" errorMode="rollbackBlockAndFail">
        <hs:replaceRequest select="./hs:cat/@ref">
            <hs:attributes ref="m:smallWidget"/>
        </hs:replaceRequest>
        <hs:insertRequest select=".">
            <hs:cat ref="m:formerlyBigWidget"/>
        </hs:insertRequest>
    </hs:updateBlock>
    <hs:updateBlock select="//m:widget[@id='8']" minOccurs="1" maxOccurs="1" errorMode="rollbackBlockAndFail">
        <hs:replaceRequest select="./hs:cat/@ref">
            <hs:attributes ref="m:smallWidget"/>
        </hs:replaceRequest>
        <hs:insertRequest select=".">
            <hs:cat ref="m:formerlyBigWidget"/>
        </hs:insertRequest>
    </hs:updateBlock>
    <hs:updateBlock select="//order[@id='6']" minOccurs="1" maxOccurs="1" errorMode="rollbackBlockAndFail">
        <hs:replaceRequest select="./m:status">
            <m:status>backordered</m:status>
        </hs:replaceRequest>
        <hs:replaceRequest select="./m:widget[@idRef='4']/@number">
            <hs:attributes number="3"/>
        </hs:replaceRequest>
    </hs:updateBlock>
</hs:updateRequest>
```

Note that the second Update block failed since it specified a non-existance "m:widget" element having an "id" attribute of value "7".

The following is an example response to this update request:

```xml
<hs:updateResponse newChangeNumber="13">
    <hs:updateBlockStatus selectedNodeCount="1" status="success">
        <hs:replaceResponse selectedNodeCount="1" status="success"/>
        <hs:insertResponse selectedNodeCount="1" status="success"/>
    </hs:updateBlockStatus>
    <hs:updateBlockStatus selectedNodeCount="0" status="rollback">
        <hs:replaceResponse status="notAttempted"/>
        <hs:insertResponse status="notAttempted"/>
    </hs:updateBlockStatus>
    <hs:updateBlockStatus status="notAttempted">
        <hs:replaceResponse status="notAttempted"/>
        <hs:insertResponse status="notAttempted"/>
    </hs:updateBlockStatus>
    <hs:updateBlockStatus status="notAttempted">
        <hs:replaceResponse status="notAttempted"/>
        <hs:replaceResponse status="notAttempted"/>
    </hs:updateBlockStatus>
</hs:updateResponse>
```

Note that all updateBlocks after the failed block are not attempted since this "updateRequest" has a "rollbackBlockAndFail" error mode.

The following is the XML document after the execution of the update operation.

```xml
<m:myWidgets instanceId="1976" changeNumber="13">
    <m:widget id="4" changeNumber="8" creator="532656235265">
        <hs:cat ref="m:bigWidget"/>
        <m:name xml:lang="en">TurboMaster 3000</m:name>
        <m:unitPrice currency="PLN">8.99</m:unitPrice>
    </m:widget>
    <m:widget id="5" changeNumber="10" creator="532656235265">
```

```
    <hs:cat ref="m:bigWidget"/>
    <m:name xml:lang="en">MegaInterceptor 4000</m:name>
    <m:unitPrice currency="USD">128.00</m:unitPrice>
  </m:widget>
  <m:order id="6" changeNumber="13" creator="532656235265">
    <m:status>shipped</m:status>
    <m:shipTo>
      <m:officialAddressLine xml:lang="en">1 Microsoft Way</m:officialAddressLine>
      <m:internalAddressLine xml:lang="en">118/1594</m:internalAddressLine>
      <m:primaryCity xml:lang="en">Redmond</m:primaryCity>
      <m:subdivision xml:lang="en">WA</m:subdivision>
      <m:postalCode xml:lang="en">98052</m:postalCode>
    </m:shipTo>
    <m:widget idRef="4" number="2"/>
    <m:widget idRef="5" number="2"/>
    <m:summary id="8" changeNumber="13" creator="532656235265">
      <m:subtotal>273.98</m subtotal>
      <m:shipping>10.00</m:shipping>
      <m:handling>2.00</m:handling>
      <m:total>285.98</m:total>
    </m:summary>
  </m:order>
</m:myWidgets>
```

Alternatively, a "rollbackBlockAndContinue" error mode allows for the roll back operation to be performed while continue with subsequent update operations. The remaining error mode is "ignore", in which case a failure simply skips the remaining steps in the updateBlock and moves on to the next one.

In the example implementation, whenever a top-level element is inserted, modified, or deleted, a new change number is assigned to that changed element. Then, the change number is propagated up the hierarchy to any higher priority elements (e.g., from top-level elements to the root element). If multiple elements are changed in a single operation, they may all be assigned the same change number. The change numbers may then be used to synchronize the data structure with copies of the data structure on client devices.

This may be accomplished in the implementation via, for example, an XML "changeQuery" operation. For example, suppose the target XML document has the following form:

```
<m:mywidgets instanceId="1976" changeNumber="34">
  <m:widget id="4" changeNumber="8" creator="5326562352651">
    <hs:cat ref="m:bigWidget"/>
    <m:name xml:lang="en">TurboMaster 3000</m:name>
    <m:unitprice currency="PLN">8.99</m:unitPrice>
  </m:widget>
  <m:widget id="5" changeNumber="10" creator="532656235265">
    <hs:cat ref="m:bigWidget"/>
    <m:name xml:lang="en">MegaInterceptor 4000</m:name>
    <m:unitPrice currency="USD">128.00</m:unitPrice>
  </m:widget>
  <m:order id="1" changeNumber="34" creator="532656235265">
    <m:status>backordered</m:status>
    <m:shipTo/>
    <m:summary id="2" changeNumber="34" creator="532656235265">
      <m:subtotal>0</m:subtotal>
      <m:shipping>0</m:shipping>
      <m:handling>0</m:handling>
      <m:total>0</m:total>
    </m:summary>
  </m:order>
</m:myWidgets>
```

Now suppose the generic navigation module 250 receives the following "queryRequest" request:

```
<hs:queryRequest>
  <hs:changeQuery select="/m:myWidgets/*" baseChangeNumber="8"/>
</hs:queryRequest>
```

This request indicates that the current change number of the "m:myWidgets" root element as copied on the client device is "8". However, the most updated change number for the "m:myWidgets" element is "34". A response may include various commands to the client that the client would need to perform to be synchronized with respect to that "m:myWidgets" element. An example response may be as follows:

```
<hs:queryResponse>
  <hs:changeQueryResponse status="success">
    <m:widget id="5" changeNumber="10" creator="532656235265">
      <hs:cat ref="m:bigWidget"/>
      <m:name xml:lang="en">MegaInterceptor 4000</m:name>
      <m:unitprice currency="USD">128.00</m:unitPrice>
    </m:widget>
    <m:order id="1" changeNumber="34" creator="532656235265">
      <m:status>backordered</m:status>
      <m:shipTo/>
      <m:summary id="2" changeNumber="34" creator="532656235265">
        <m:subtotal>0</m:subtotal>
        <m:shipping>0</m:shipping>
        <m:handling>0</m:handling>
        <m:total>0</m:total>
      </m:summary>
    </m:order>
    <hs:deletedBlue id="9" changeNumber="26"/>
    <hs:deletedBlue id="10" changeNumber="26"/>
  </hs:changeQueryResponse>
</hs:queryResponse>
```

Having now described the principles of the present invention in detail, it is noted that the precise hardware configuration that implements the above-described features is not important to the present invention. For example, it is not important to the principles of the present invention where the generic navigation module 250 is implemented, although faster access to the various data structures 210, 220, 230 and 240 would improve performance. Also, it is not important where the navigation assistance module 260 is implemented.

Figure 6:
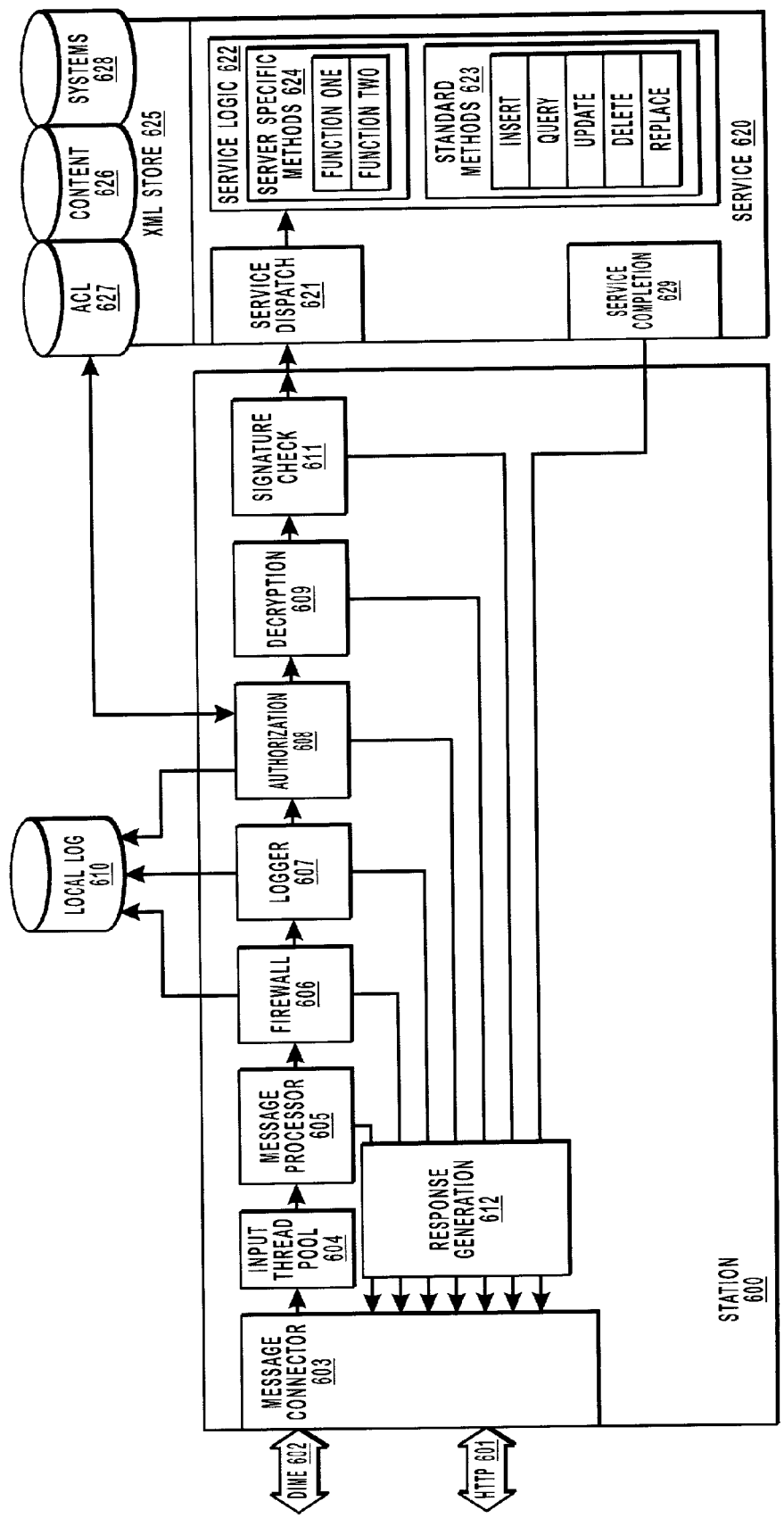
FIG. 6 schematically illustrates a station that may perform centralized processing of communications between the applications and the services.

In one example embodiment, all of the requests are filtered through a centralized station that consolidates and performs functions that are common to each of the services. FIG. 6 illustrates a more specific diagram of the station 600 and the generic navigation module illustrated as service 620. The station 600 receives a request from an application using a network protocol such as HyperText Transport Protocol (HTTP) represented by arrow 601, or Direct Internet Message Encapsulation (DIME) represented by arrow 602. The station 600 includes a message connector 603, which receives the request and passes the message up the protocol stack so that the request may be further processed. The request is then provided to an input thread pool 604 for temporary storage.

The request is then parsed at a message processor 605, which parses the request into various components. For example, in one embodiment, the request is a Simple Object Access Protocol (SOAP) message in which case the message processor 605 parses using the appropriate SOAP protocol. The message processor 605 may also perform some preliminary level of rule checking to make sure the request should be further processed. For example, if the request is to manipulate a data structure that the generic navigation module does not manage, the message processor 605 may abstain from passing the request further down the process flow, and instead simply generate an error message using the response generation module 612 to be returned via the message connector 603.

The request may then be filtered by a firewall 606 and then logged using a logger 607. A firewall may also reject a request and generate an error message using the response generation module 612 that is returned as a response via the message connector 603. A local log 610 may receive and store event information received from the firewall 606, as well as normal logging information received from the logger 607 such as the following for each received request: time received, method type, attribute types, and address of request. Then, an authorization module 608 determines if the request is authorized to perform the requested operation on the target data structure. If authorization fails, then an error message is returned via the response generation module 612 and the message connector 603. Then authorization module 608 may consult the role list database 627.

In one example, the request is in the form of an SOAP envelope, which contains unencrypted header information, as well as an optional encrypted body portion. A decryption module 609 decrypts the body of the request. Then, a signature checker 611 checks any signatures associated with the request to guard against tampering. Any failed decryption or signature checking may also be returned to the requestor in the form of an error message generated by the response generation module 612.

After signature checking, the station 600 then passes information sufficient to accomplish the requested operation to the appropriate target service (in this case, the generic navigation module). This information includes a message that the request is authorized, the scope of access permissions, an identification of the requested method, and any needed request details.

The information is then passed to the service dispatch module 621 of the service 620. The service logic 622 then receives and processes the information. The service logic 622 is capable of perform standard methods 623 including insert, query, update, delete, and replace as well as possibly some service specific methods 624.

In order to execute the requested operation, the service logic accesses a data store that store the data structures to be manipulated. In one embodiment, the data structures to be operated upon are eXtensible Markup Language (XML) documents in which case the data store is an XML store 625. The data structures to be accessed may be content documents 626, role list documents 627 or system documents 628.

Once the requested operation is performed on the target data structure using the service logic 622 interacting with the XML store 625, response information is provided to service completion module 629. The response information is then passed to response generation module 612 for generation of an appropriate response. The response is then returned to the user via the message connector 603.

Having now described the principles of the present invention in detail, it is noted that the precise hardware configuration that implements the above-described features is not important to the present invention. Indeed, one of the unique features of the present invention is its lack of dependence on the hardware operating environment.

Figure 5:
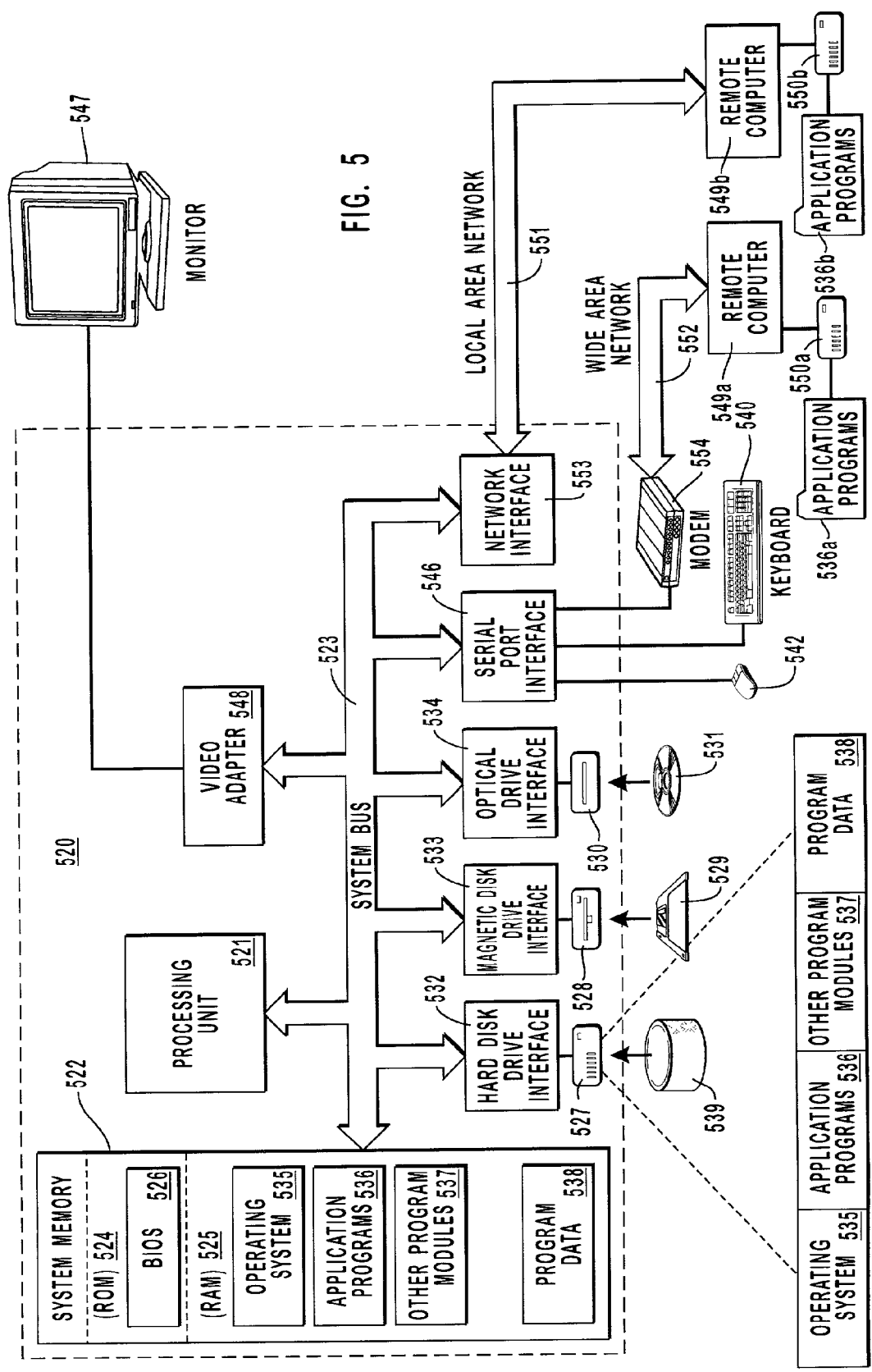
FIG. 5 schematically illustrates a computing device that may implement the features of the present invention.

Nevertheless, for the sake of completeness, FIG. 5 illustrates an example computing system that may itself or in combination with other computing devices implement all or portions of the features described above. The example system includes a general purpose computing device in the form of a conventional computing device 520, including a processing unit 521, a system memory 522, and a system bus 523 that couples various system components including the system memory 522 to the processing unit 521. The system bus 523 may be any of several types of bus structures including a memory bus or memory controller, a peripheral bus, and a local bus using any of a variety of bus architectures. The system memory includes read only memory (ROM) 524 and random access memory (RAM) 525. A basic input/output system (BIOS) 526, containing the basic routines that help transfer information between elements within the computer 520, such as during start-up, may be stored in ROM 524.

The computer 520 may also include a magnetic hard disk drive 527 for reading from and writing to a magnetic hard disk 539, a magnetic disk drive 528 for reading from or writing to a removable magnetic disk 529, and an optical disk drive 530 for reading from or writing to removable optical disk 531 such as a CD-ROM or other optical media. The magnetic hard disk drive 527, magnetic disk drive 528, and optical disk drive 530 are connected to the system bus 523 by a hard disk drive interface 532, a magnetic disk drive-interface 533, and an optical drive interface 534, respectively. The drives and their associated computer-readable media provide nonvolatile storage of computer-executable instructions, data structures, program modules and other data for the computer 520. Although the exemplary environment described herein employs a magnetic hard disk 539, a removable magnetic disk 529 and a removable optical disk 531, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 539, magnetic disk 529, optical disk 531, ROM 524 or RAM 525, including an operating system 535, one or more application programs 536, other program modules 537, and program data 538. For example, generic navigation module 250 and navigation assistance module 260 may each be an application program such as application programs 536 or a program module such as program modules 537. In addition, the calendar data 210, in-box data 220, document data 230, and other data 240 may each be program data 538.

A user may enter commands and information into the computer 520 through keyboard 540, pointing device 542, or other input devices (not shown), such as a microphone, joy stick, game pad, satellite dish, scanner, or the like. These and other input devices are often connected to the processing unit 521 through a serial port interface 546 coupled to system bus 523. Alternatively, the input devices may be connected by other interfaces, such as a parallel port, a game port or a universal serial bus (USB). A monitor 547 or another display device is also connected to system bus 523 via an interface, such as video adapter 548. In addition to the monitor, personal computers typically include other peripheral output devices (not shown), such as speakers and printers.

The computer 520 may operate in a networked environment using logical connections to one or more remote computers, such as remote computers 549a and 549b. Remote computers 549a and 549b may each be another personal computer, a server, a router, a network PC, a peer device or other common network node, and typically include many or all of the elements described above relative to the computer 520, although only memory storage devices 550a and 550b and their associated application programs 536a and 536b have been illustrated in FIG. 5. The logical connections depicted in FIG. 5 include a local area network (LAN) 551 and a wide area network (WAN) 552 that are presented here by way of example and not limitation. Such networking environments are commonplace in office-wide or enterprise-wide computer networks, intranets and the Internet. These networks may be the means whereby the network messages are communicated between the application 320 and the data service 331.

When used in a LAN networking environment, the computer 520 is connected to the local network 551 through a network interface or adapter 553. When used in a WAN networking environment, the computer 520 may include a modem 554, a wireless link, or other means for establishing communications over the wide area network 552, such as the Internet. The modem 554, which may be internal or external, is connected to the system bus 523 via the serial port interface 546. In a networked environment, program modules depicted relative to the computer 520, or portions thereof, may be stored in the remote memory storage device. It will be appreciated that the network connections shown are exemplary and other means of establishing communications over wide area network 552 may be used.

Accordingly, the principles of the present invention allow for standardized access to data structures regardless of the data type associated with the data structure. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. In a computer system that manages two or more different types of data structures, each type of data structure being organized in accordance with a set of rules and corresponding to an identity, a method for directly operating on data structures in a generic manner regardless of the type of data structure being operated upon and without requiring dedicated executable code for manipulating data structures of a particular data type, the method comprising the following:

an act of recognizing a common set of command methods that operate on data structures of a number of different data types corresponding to a plurality of applications and to a plurality of identities that control access to the data structures;

an act of accessing a request to execute a command method on at least a portion of a data structure of a particular data type corresponding to one or more applications and to a particular identity, the command method being one of the common set of command methods, and the request to execute the command method identifying the data structure by identifying (i) the particular identity, (ii) a set of rules associated with the particular data type, and (iii) an instance to be operated upon from among more than one instance of the particular data type for the particular identity; and a step for executing the command method on at least a portion of the data structure in accordance with a set of rules associated with the particular data type.

2. A method in accordance with claim 1, wherein the step for executing the command method on at least a portion of the data structure comprises:

an act of accessing a set of rules associated with the particular data type, the set of rules defining organization for data structures of the particular data type and what portions of data structure of the particular data type enable commands to be executed thereon;

an act of finding the portion of the data structure that is to be operated upon by interpreting the request in light of the set of rules;

an act of determining that the command method may be implemented on the portion of the data structure by consulting the set of rules; and an act of executing the command method on the found portion of the data structure.

3. A system for directly operating on data structures in a generic manner regardless of the type of data structure being operated upon and without requiring dedicated executable code for manipulating data structures of a particular data type, the system comprising:

a data structure of a particular data type corresponding to one or more applications, the data structure organized in accordance with a set of rules and associated with an identity;

a navigation module configured to recognize a common set of command methods that are used to operate on data structures of a number of different data types corresponding to a plurality of applications and to a plurality of identities that control access to the data structures, including the data structure of the particular data type, the navigation module identifying the data structure by identifying (i) the identity, (ii) the set of rules associated with the identity, and (iii) an instance to be operated upon from among more than one instance of the particular data type for the identity, wherein the navigation module is communicatively coupled to the data structure in order to navigate through the data structure using the set of rules and perform any of the common set of command methods on the data structure; and a navigation assistance module communicatively coupled to the navigation module, the navigation assistance module containing the set of rules that describe the organization of the data structure.

4. A system in accordance with claim 3, wherein the data structure is a first data structure, the particular data type is a first data type, and the set of rules is a first set of rules, wherein the system further comprises:

a second data structure of a second data type, the second data structure being organized in accordance with a second set of rules, wherein the navigation assistance module also contains the second set of rules, wherein the navigation module enables navigation through the second data structure using the second set of rules and performing any of the common set of command methods on the second data structure.

5. In a computer system that manages two or more different types of data structures, each type of data structure being organized in accordance with a set of rules and corresponding to an identity, a method for directly operating on data structures in a generic manner regardless of the type of data structure being operated upon and without requiring dedicated executable code for manipulating data structures of a particular data type, the method comprising:

an act of accessing a request to execute a command method on at least a portion of a data structure of a particular data type corresponding to one or more of a plurality of applications and to a particular identity that controls access to the data structure, the request identifying the data structure by identifying (i) the particular identity, (ii) a set of rules associated with the particular data type, and (iii) an instance to be operated upon from among more than one instance of the particular data type for the particular identity;

an act of accessing the set of rules associated with the particular data type, the set of rules defining how data structures of the particular data type are organized; and an act of executing the command method on a portion of the data structure determined by interpreting the request in light of the set of rules.

6. A method in accordance with claim 5, wherein the act of executing the command method on a portion of the data structure determined by interpreting the request in light of the set of rules comprises:

an act of accessing an identification of a location of the portion of the data structure;

an act of navigating to the location of the portion of the data structure using the identification of the location of the portion of the data structure;

an act of accessing an identification of a data type contained in the portion of the data structure; and an act of determining the portion of the data structure that is to be operated upon using the identification of the location of the portion of the data structure, as well as the identification of the data contained in the portion of the data structure.

7. A method in accordance with claim 5, wherein the act of accessing a request to execute a command method on at least a portion of a data structure of a particular data type comprises the following:

an act of accessing a request to query the portion of the data structure to determine if the portion of a data structure is synchronized with a copy of the portion of the data structure.

8. A method in accordance with claim 7, wherein the act of executing the command method on a portion of the data structure comprises:

an act of comparing a version identifier of the portion of the data structure with a version identifier of the copy of the portion of the data structure.

9. A method in accordance with claim 5, wherein the set of rules associated with the particular data type comprises a schema that defines a class of extensible Markup Language documents.

10. In a computer system that manages two or more different types of data structures, each type of data structure being organized in accordance with a set of rules and corresponding to an identity, a method for directly operating on data structures in a generic manner regardless of the type of data structure being operated upon and without requiring dedicated executable code for manipulating data structures of a particular data type, the method comprising the following:

an act of recognizing a common set of command methods that operate on data structures of a number of different data types corresponding to a plurality of applications and to a plurality of identities that control access to the data structures;

an act of accessing a request to execute a command method on at least a portion of a data structure of a particular data type corresponding to one or more applications and to a particular identity, the command method being one of the common set of command methods, and the request to execute the command method identifying the data structure by identifying (i) the particular identity, (ii) a set of rules associated with the particular data type, and (iii) an instance to be operated upon from among more than one instance of the particular data type for the particular identity; and a step for executing the command method on at least a portion of the data structure in accordance with a set of rules associated with the particular data type.

11. A method in accordance with claim 10, wherein the act of finding the portion of the data structure that is to be operated upon comprises:

an act of accessing an identification of a location of the portion of the data structure;

an act of navigating to the location of the portion of the data structure using the identification of the location of the portion of the data structure;

an act of accessing an identification of a data type contained in the portion of the data structure; and an act of determining the portion of the data structure that is to be operated upon using the identification of the location of the portion of the data structure, as well as the identification of the data contained in the portion of the data structure.

12. A method in accordance with claim 11, wherein a plurality of portions of the data structure are identified using the identification of the location of the portion of the data structure, as well as the identification of the data type contained in the portion of the data structure, the act of determining the portion of the data structure further comprising:

an act of accessing a unique identifier associated with the portion of the data structure that is to be operated upon, the unique identifier uniquely distinguishing the portion of the data structure that is to be operated upon from amongst the plurality of portions of the data structure that have the same location and data type.

13. A method in accordance with claim 10, wherein the act of determining that the command method is allowed to be implemented on the portion of the data structure by consulting the set of rules comprises:

an act of determining that the portion of the data structure is compatible with performing the command method.

14. A method in accordance with claim 13, further comprising:

an act of determining that a request that issued the command method is authorized to execute the command method on the portion of the data structure that is to be operated upon.

15. A method in accordance with claim 10, wherein the act of accessing a request to implement a command method on at least a portion of a data structure of a particular data type comprises the following:

an act of accessing a request to query the portion of the data structure to determine if the portion of a data structure is synchronized with a copy of the portion of the data structure.

16. A method in accordance with claim 15, wherein the act of executing the command method on the found portion of the data structure comprises:

an act of comparing a version identifier of the portion of the data structure with a version identifier of the copy of the portion of the data structure.

17. A method in accordance with claim 16, wherein the act of executing the command method on the found portion of the data structure further comprises:

an act of determining that the version identifier of the portion of the data structure is the same as the version identifier of the copy of the portion of the data structure.

18. A method in accordance with claim 17, wherein the act of executing the command method on the found portion of the data structure further comprises:

an act of reporting that the portion of the data structure is synchronized with the copy of the portion of the data structure.

19. A method in accordance with claim 16, wherein the act of executing the command method on the found portion of the data structure further comprises:

an act of determining that the version identifier of the portion of the data structure is different than the version identifier of the copy of the portion of the data structure.

20. A method in accordance with claim 19, wherein the act of executing the command method on the found portion of the data structure further comprises:

an act of responding to the request with a response that includes instructions that are configured to bring the copy of the portion of the data structure in synchronization with the portion of the data structure.

21. A method in accordance with claim 10, wherein the act of accessing a request to implement a command method on at least a portion of a data structure of a particular data type comprises the following:

an act of accessing a request to insert information into the portion of the data structure.

22. A method in accordance with claim 10, wherein the act of accessing a request to implement a command method on at least a portion of a data structure of a particular data type comprises the following:

an act of accessing a request to delete the portion of the data structure.

23. A method in accordance with claim 10, wherein the act of accessing a request to implement a command method on at least a portion of a data structure of a particular data type comprises the following:

an act of accessing a request to replace the portion of the data structure with a new portion of a data structure.

24. A method in accordance with claim 10, wherein the act of accessing a request to implement a command method on at least a portion of a data structure of a particular data type comprises the following:

an act of accessing a query regarding the portion of the data structure.

25. A method in accordance with claim 10, wherein the set of rules associated with the particular data type comprises a schema that defines a class of extensible Markup Language documents.

26. A method in accordance with claim 25, wherein the class comprises a class of XML documents that define calendar information.

27. A method in accordance with claim 25, wherein the class comprises a class of XML documents that define in-box information.

28. A method in accordance with claim 25, wherein the class comprises a class of XML documents that define document information.

29. A method in accordance with claim 25, wherein the class comprises a class of XML documents that define presence information.

30. A method in accordance with claim 25, wherein the class comprises a class of XML documents that define personal address information.

31. A method in accordance with claim 25, wherein the class comprises a class of XML documents that define contacts information.

32. A method in accordance with claim 25, wherein the class comprises a class of XML documents that define application setting information.

33. A method in accordance with claim 25, wherein the class comprises a class of XML documents that define physical device information.

34. A method in accordance with claim 25, wherein the class comprises a class of XML documents that define favorite Web site information.

35. A method in accordance with claim 25, wherein the class comprises a class of XML documents that define payment information.

36. A method in accordance with claim 25, wherein the class comprises a class of XML document that define notification information.

37. A method in accordance with claim 10, wherein the act of determining that the command method may be implemented on the portion of the data structure by consulting the set of rules comprises the following:

an act of determining that the portion of the data structure is a root element of the data structure.

38. A method in accordance with claim 10, wherein the act of determining that the command method may be implemented on the portion of the data structure by consulting the set of rules comprises the following:

an act of determining that the portion of the data structure is second-level nested element of the data structure.

39. A method in accordance with claim 10, wherein the act of determining that the command method may be implemented on the portion of the data structure by consulting the set of rules comprises the following:

an act of determining that the portion of the data structure is a selectable attribute associated with a second-level nested element of the data structure, wherein only some of the attributes associated with the portion of the data structure are selectable.

40. A method in accordance with claim 10, wherein the particular identity is an individual.

41. A method in accordance with claim 10, wherein the particular identity is a group of individuals.

42. A method in accordance with claim 10, wherein the particular identity is an organization.

43. A method in accordance with claim 10, wherein the data structure comprises a hierarchical data structure.

44. A computer program product for use in a computer system that manages two or more different types of data structures, each type of data structure being organized in accordance with a set of rules, the computer program product for executing a method for directly operating on data structures in a generic manner regardless of the type of data structure being operated upon and without requiring dedicated executable code for manipulating data structures of a particular data type, the computer program product comprises one of more physical storage media having stored thereon:

computer-executable instructions for recognizing a common set of command methods that operate on data structures of a number of different data types corresponding to a plurality of applications and to a plurality of identities that control access to the data structures;

computer-executable instructions for accessing a request to execute a command method on at least a portion of a data structure of a particular data type corresponding to one or more applications and to a particular identity, the command method being one of the common set of command methods, and the request to execute the command method identifying the data structure by identifying (i) the particular identity, (ii) a set of rules associated with the particular data type, and (iii) an instance to be operated upon from among more than one instance of the particular data type for the particular identity;

computer-executable instructions for accessing the set of rules associated with the particular data type, the set of rules defining how data structures of the particular data type are organized, and what portions of data structure of the particular data type are allowed to have what commands executed thereon;

computer-executable instructions for finding the portion of the data structure that is to be operated upon by interpreting the request in light of the set of rules;

computer-executable instructions for determining that the command method is allowed to be implemented on the portion of the data structure by consulting the set of rules; and computer-executable instructions for executing the command method on the found portion of the data structure.

45. A computer program product in accordance with claim 44, wherein the one or more computer readable media are physical storage media.

46. A computer program product in accordance with claim 44, wherein the computer-executable instructions for finding the portion of the data structure that is to be operated upon comprise:

computer-executable instructions for accessing an identification of a location of the portion of the data structure;

computer-executable instructions for navigating to the location of the portion of the data structure using the identification of the location of the portion of the data structure;

computer-executable instructions for accessing an identification of a data type contained in the portion of the data structure; and computer-executable instructions for determining the portion of the data structure that is to be operated upon using the identification of the location of the portion of the data structure, as well as the identification of the data contained in the portion of the data structure.

47. A computer program product in accordance with claim 44, wherein the computer-executable instructions for determining that the command method may be implemented on the portion of the data structure by consulting the set of rules comprises:

computer-executable instructions for determining that the portion of the data structure is compatible with performing the command method.

48. A computer program product in accordance with claim 47, wherein the one or more computer-readable media further have stored thereon:

computer-executable instructions for determining that a request that issued the command method is authorized to execute the command method on the portion of the data structure that is to be operated upon.

\* \* \* \* \*